US008554146B2

(12) United States Patent
Kermoal et al.

(10) Patent No.: US 8,554,146 B2
(45) Date of Patent: Oct. 8, 2013

(54) METHOD AND APPARATUS FOR REDUCING THE GUARD BAND BETWEEN WIRELESS COMMUNICATION SYSTEMS OPERATING IN THE SAME GEOGRAPHICAL AREA

(75) Inventors: Jean-Philippe Kermoal, Copenhagen (DK); Klaus Doppler, Espoo (FI)

(73) Assignee: Nokia Corporation, Espoo (FI)

( * ) Notice: Subject to any disclaimer, the term of this patent is extended or adjusted under 35 U.S.C. 154(b) by 1204 days.

(21) Appl. No.: 11/901,952

(22) Filed: Sep. 18, 2007

(65) Prior Publication Data

US 2008/0075059 A1     Mar. 27, 2008

Related U.S. Application Data

(60) Provisional application No. 60/845,602, filed on Sep. 18, 2006.

(51) Int. Cl.
*H04B 1/00*         (2006.01)
*H04B 15/00*        (2006.01)

(52) U.S. Cl.
USPC ..................................... 455/63.1; 455/67.11

(58) Field of Classification Search
USPC .......... 455/452.2, 501, 522, 524, 63.1, 67.11, 455/67.13, 69, 454
See application file for complete search history.

(56) References Cited

U.S. PATENT DOCUMENTS

| | | | |
|---|---|---|---|
| 6,621,454 B1 * | 9/2003 | Reudink et al. | 342/367 |
| 2006/0094370 A1 * | 5/2006 | Nguyen | 455/67.13 |
| 2007/0232349 A1 * | 10/2007 | Jones et al. | 455/552.1 |

FOREIGN PATENT DOCUMENTS

| | | |
|---|---|---|
| EP | 1 204 283 | 5/2002 |
| EP | 1 435 744 | 7/2004 |
| WO | WO 2004/019622 | 3/2004 |
| WO | WO 2005/036909 | 4/2005 |
| WO | WO 2005036909 A1 * | 4/2005 |

OTHER PUBLICATIONS

IST-2003-507581 Winner D2.5 V1.0, "Duplex arrangements for future broadband radio interfaces", Oct. 30, 2004, pp. 1-121.

\* cited by examiner

*Primary Examiner* — Ping Hsieh
(74) *Attorney, Agent, or Firm* — Harrington & Smith

(57) ABSTRACT

Operators of wireless communication systems operating in the same geographic area are able to build networks on neighboring/adjacent bands, even if one of the systems is using a TDD mode and the other systems is using a FDD mode without using excessive large guard bands. A beaconing mechanism with signaling is used to impose an exclusion zone and power restriction, antenna direction, and other operational parameters. A newcomer operator is able to get an accurate knowledge of the interference to and from the sites of the AP of the existing operator so that the newcomer can deploy his APs without causing interference to the existing APs.

28 Claims, 10 Drawing Sheets

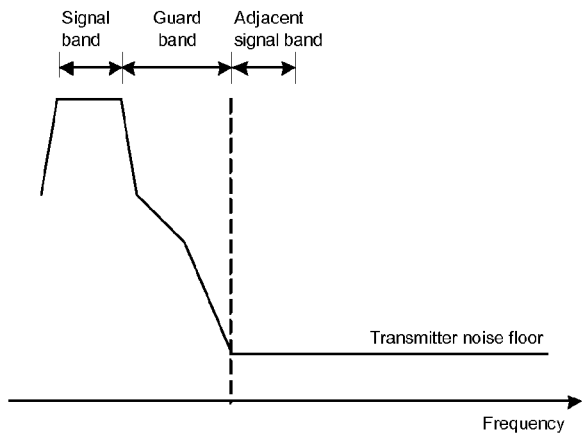
Prior Art
FIG. 3
| | Limiting interference scenario | Transmitter noise floor | Guard band requirement relative to the bandwidth | | Guard band requirement | |
|---|---|---|---|---|---|---|
| | | | NB | WB | NB | WB |
| AP | AP-to-AP[1] | -100 dBm/Hz | 2.02 | 1.54 | 21.0 MHz | 128 MHz |
FIG. 4
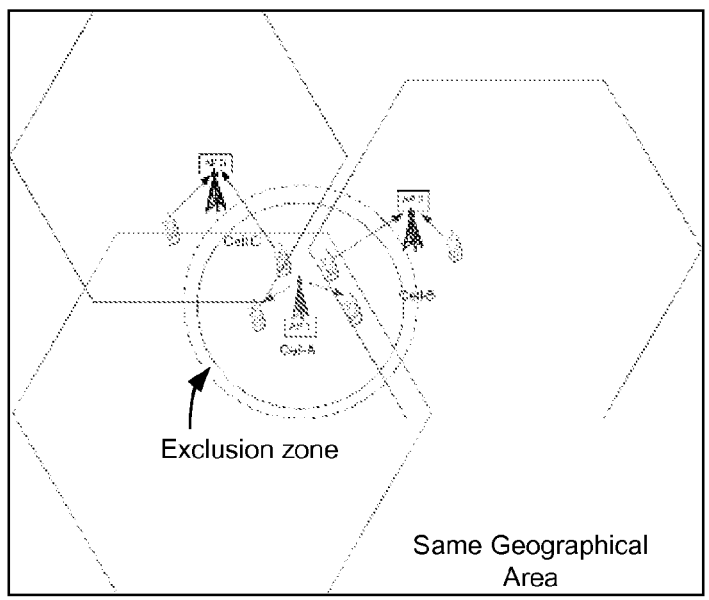
FIG. 5

Guard Band Reduction Enabled Apparatus one or more beacon signal preparing modules congifured for preparing a beacon signal for transmission one or more providing modules configured for providing the beacon signal for transmission one or more transmitting modules configured for transmitting the beacon signal one or mre receiver modules configured for receiving the beacon signal one or more modules confugued for calculating the coupling loss between the transmitting mobile terminal, node, point or device and the receiving mobile terminal, node, point or device one or more modules configured for calculating the interference level to adjust the guard band between two wireless communication systems operating in the same geographical area other modules in the mobile terminal, node, point or device

FIG. 8

METHOD AND APPARATUS FOR REDUCING THE GUARD BAND BETWEEN WIRELESS COMMUNICATION SYSTEMS OPERATING IN THE SAME GEOGRAPHICAL AREA

CROSS REFERENCE TO RELATED APPLICATIONS

Reference is made to and priority claimed from U.S. provisional application Ser. No. 60/845,602, filed Sep. 18, 2006.

FIELD OF THE INVENTION

The invention relates generally to the field of wireless communication systems and deals more specifically with reducing the guard band requirements between wireless communication systems that operate in the same geographical area.

BACKGROUND OF THE INVENTION

Wireless communication systems operating in the same geographical area or adjacent spectral bands interfere with one another and require large guard bands to minimize such interference which results in an inefficient usage of scarce spectrum resources. The Downlink (DL)/Uplink (UL) interference problem that typically occurs between APs (access points) of uncoordinated cells is illustrated for example in FIG. 1.

If both APs use FDD based duplexes (i.e. pure FDD or half duplex FDD) the interferer will be sufficiently separated in frequency from the wanted signal such that receiver filtering and out-of-band emission requirement specification are realizable and obtainable such that interference is dealt with sufficiently.

However, if one or both APs is using a TDD based duplex in one of its bands (i.e. pure TDD, DL/UL oriented hybrid, dual band hybrid or band switching FDD) then for uncoordinated APs, one AP will be receiving at the same time as the other AP is transmitting in the same or adjacent bands.

In the worse case scenario the APs of different operators are co-located. The minimum coupling loss can be increased from 30 dB to 45 dB by careful positioning of receive antennas, however the receive filter and transmitter out-of-band emission requirements will be very high in order to not generate harmful interference. Therefore, the co-location of different operators APs is not a viable or practical option.

Typically, spectral masks are used in wireless communication systems to allow systems to operate next to each other or in vicinity of one another. The spectrum masks have been defined in IST-2003-507581 WINNER, "D2.5 v1.0 Duplex arrangements for future broadband radio interfaces", which is incorporated herein by reference, based on the noise floor and ACPR (adjacent channel power ratio) requirements. TX spectrum masks for AP and MT in NB and WB modes are illustrated for example in FIG. 2.

The estimates for guard band requirements based on the transmitter noise floor requirements are presented both in relative and absolute terms in Table 1 shown in FIG. 4. It can be seen from Table 1 that such a strict guard band definition results in wide guard bands, in the order of one-to-three times the signal bandwidth. The values presented in Table 1 prevent any coexistence of the duplex schemes without excessive guard bands and impose extremely demanding transmitter noise floor requirements.

Coupling losses between interfering transmitter and victim receiver can be calculated based on cable losses, antenna gains and free space path loss at the carrier frequency of e.g. 5 GHz with $$L_c[dB]=32.4+20*\log(f[MHz])+20*\log(d[km])+C_{Rx}[dB]+C_{Tx}[dB]-A_{Rx}[dB]-A_{Tx}[dB] \quad \text{[equation 1]}$$

where, $L_c$ is the coupling loss, f is the carrier frequency, d is the physical separation, $C_{Rx}$ and $C_{Tx}$ are the cable losses, and $A_{Rx}$ and $A_{Tx}$ are the antenna gains at the transmitter and receiver, respectively.

In FIG. 3 it was assumed that the spectrum values decrease 19 dB/bandwidth after the first bandwidth until it reaches the noise floor. This is shown by the steeper part of the spectrum mask illustrated in FIG. 2. Thus, if the coupling loss could be increased by 19 dB, then the guard band requirements could be reduced by more than 100 MHz for a 100 MHz signal bandwidth and the required guard band would be in a reasonable range. The only part of the coupling loss Lc [dB] of equation 1 that can be influenced is the propagation part $\{20*\log(d[km])\}$, which assumes free space propagation.

Currently there is a discussion in the United Kingdom about the auctioning of the 2.5 GHz band and the FDD/TDD bands separation. The situation is such that guard bands are not defined and the discussion assumes that the operators working on neighboring bands will coordinate their sites to avoid the interference problem.

If one operator builds its network before such cooperation, the operator builds and plans it without considering such interference. If then another operator builds its network, for example two years later, then the other operators' network might deteriorate the performance of the first operators' network. As history has shown us, this may lead to unacceptable situations and such a "radio war" led to the founding of the Federal Communication Commission in the United States. Therefore, the operators will need a technical solution to help them coordinating their sites.

Accordingly, what is needed is a way for two operators to build and operate its respective wireless communication network without causing harmful interference or receiving harmful interference from the other regardless of the time the respective wireless communication networks are built.

LIST OF ABBREVIATIONS

ACPR: Adjacent channel power ratio
AP: Access Point
B3G: Beyond third generation
DL: Downlink
FDD: Frequency division duplex
MT: Mobile Terminal
NB: Narrowband (FDD mode of the WINNER system)
TDD: Time division duplex
UL: Uplink
WB: Wideband (TDD mode of the WINNER system)
WLAN: Wireless Local Area Network
WINNER: Wireless World Initiative New Radio

BRIEF DESCRIPTION OF THE DRAWINGS

FIG. 3 is a graph illustrating the guard band definition.

FIG. 4 shows a table of estimates for the guard bands based on the transmitter noise floor requirements.

FIG. 5 illustrates an example of a coexistence of a number of wireless communication systems using an exclusion zone.

FIG. 8 shows an illustrative embodiment of a guard band enabled apparatus in the form of a mobile terminal, node, point or device for use in reducing the guard band between two wireless communication system operating in the same geographic area.

SUMMARY OF THE INVENTION

Figure 1:
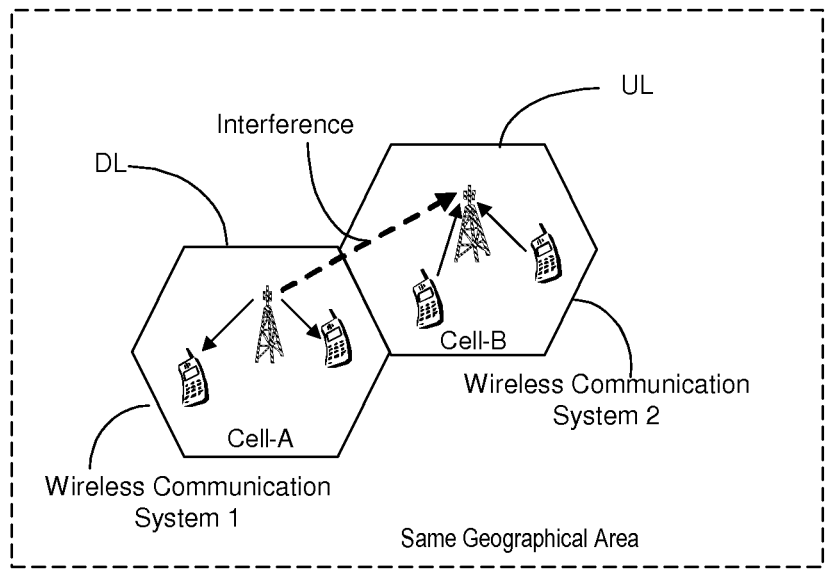
FIG. 1 illustrates the Downlink (DL)/Uplink (UL) interference problem that typically occurs between APs (access points) of uncoordinated cells.
Figure 2:
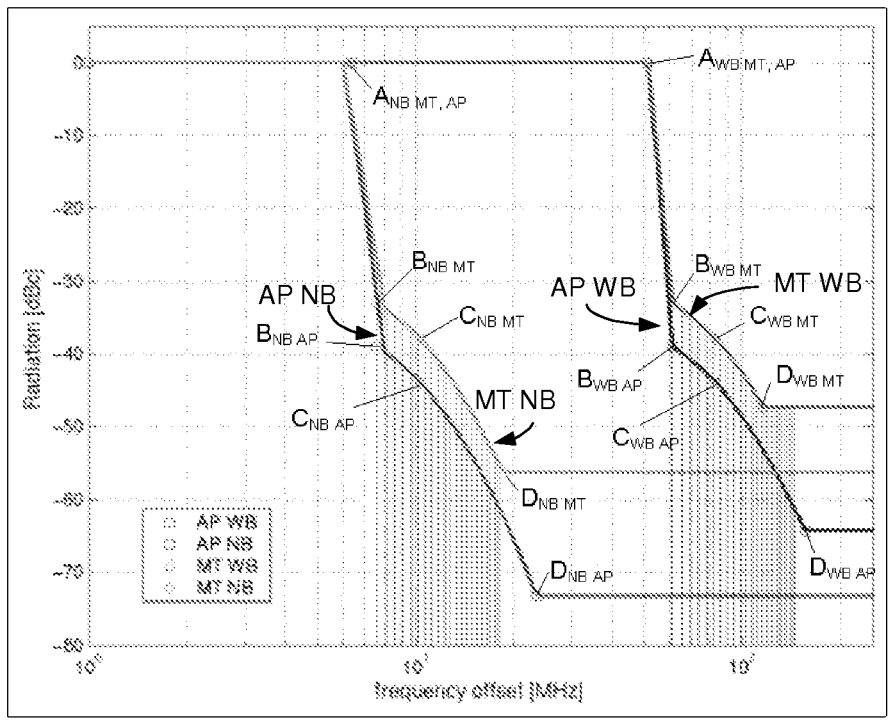
FIG. 2 illustrates TX spectrum masks for AP and MT in NB and WB modes.
Figure 6:
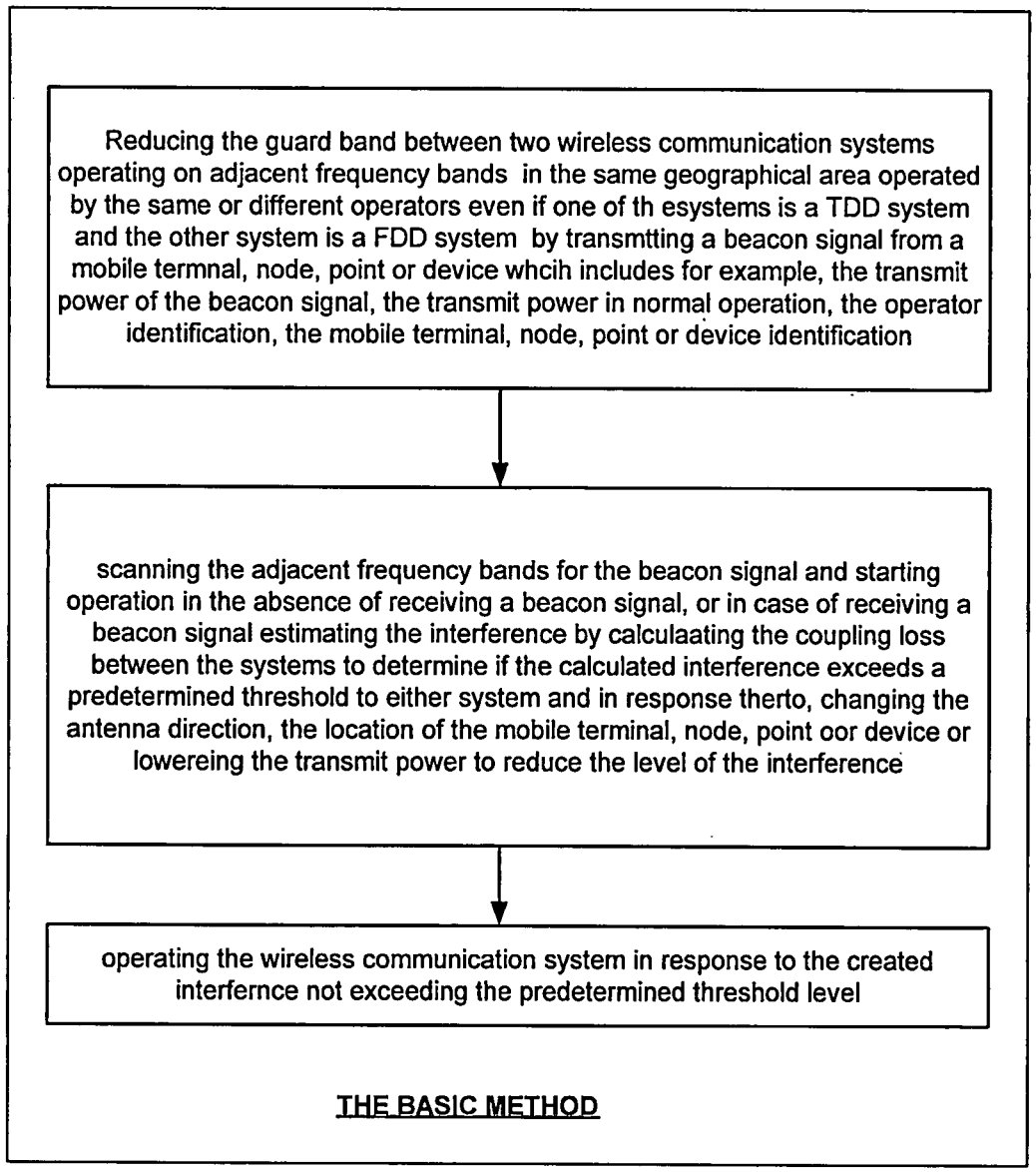
FIG. 6 illustrates the basic method for some embodiments of the invention.
Figure 7:
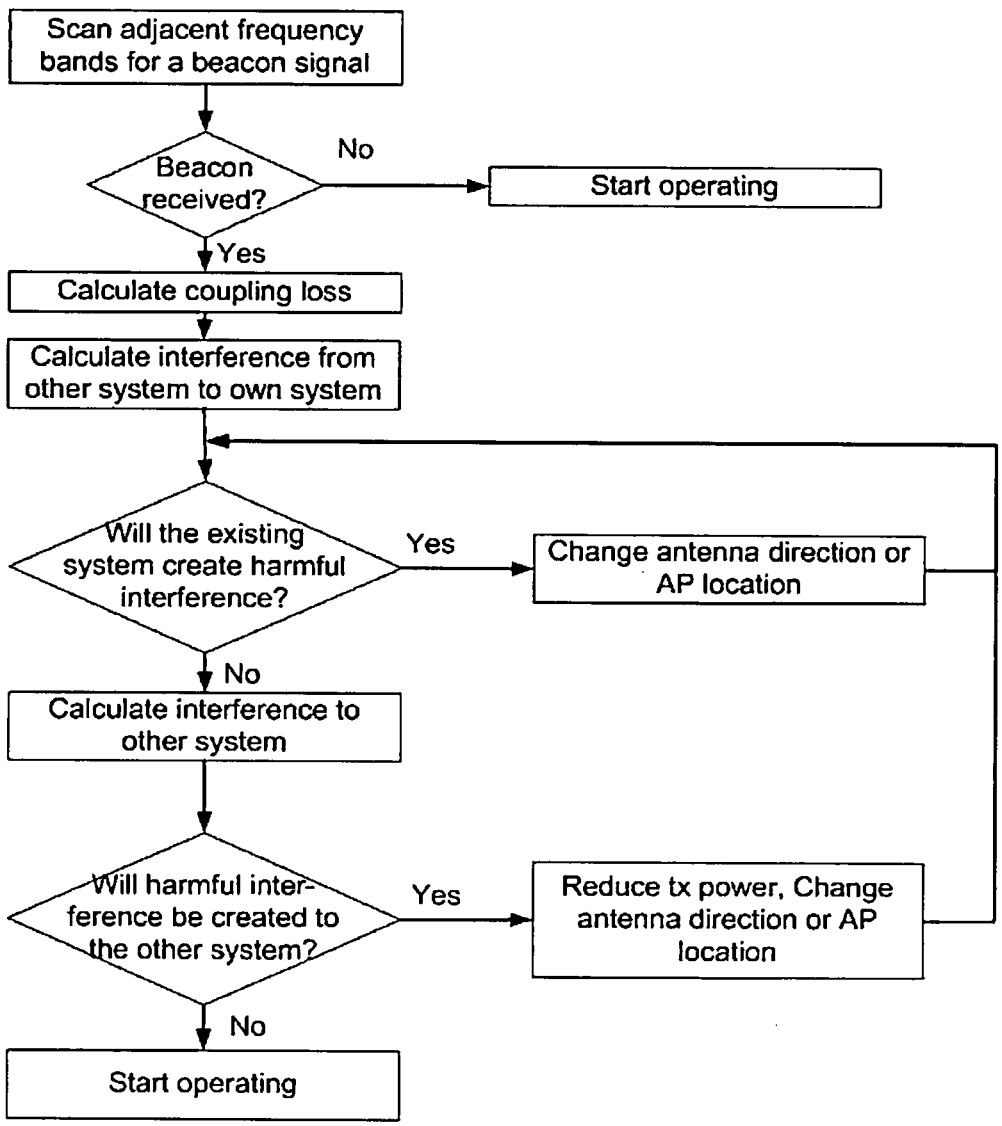
FIG. 7 is a flowchart showing the operation of one example of an embodiment of the invention using the beacon signal between two operators.

In accordance with a broad aspect of the invention, operators of wireless communication systems operating in the same geographic area are able to build networks on neighboring/adjacent bands, even if one of the systems is using a TDD mode and the other systems is using a FDD mode without using excessive large guard bands. A beaconing mechanism with signaling is used to impose an exclusion zone and power restriction, antenna direction, and other operational parameters. The concept of the invention enables a newcomer operator to get an accurate knowledge of the interference to and from the sites of the AP of the existing operator so that it can deploy his APs without causing interference to the existing APs.

A further aspect of the invention allows flexible deployment of networks without coordination between operators. In the case of a single operator, some embodiments of the invention ease the deployment and the upgrading, for instance, an existing network employing FDD mode by adding a network employing TDD mode without redeploying the FDD network.

Further, the invention can be used during the operation of two or more wireless communication systems operating in the same geographical area to optimize the system performance or to detect conflicts between the systems.

WRITTEN DESCRIPTION OF EXEMPLARY EMBODIMENTS OF THE INVENTION

The invention is explained and described by way of example, based on the two operators scenario. One of the operators has already built its network and the network is operational. The second operator builds its network sometime later, for example, two years later. The invention is used to coordinate the building of the second network. The first operator operates a network using FDD mode and the second operator builds a network using TDD mode. This scenario is exemplary only and does not bind or restrict the invention in any way to only that scenario.

As shown in the equation 1 above, the coupling losses $L_c$ between interfering transmitter and victim receiver can be calculated based on cable losses, antenna gains and free space path loss. In this example at 5 GHz, if the coupling loss could be increased by 19 dB, then the guard band requirements could be reduced by more than 100 MHz for 100 MHz signal bandwidth and the required guard band would be in a reasonable range. The only part of the coupling loss $L_c$ that can be influenced is the propagation part which assumes free space propagation due to the probability of Line-of-Sight between the APs. This signal bandwidth and carrier frequency is exemplary only and does not bind or restrict the invention in any way to only that carrier frequency or bandwidth.

Thus, if the propagation loss is high enough, then the AP of the second operator would not disturb the operation of the first operators' network. One option is to require a sufficiently high distance between the sites of the first operator and the second operator based on the free space propagation loss to achieve a high enough coupling loss. This resulting separation distance can be in the order of 1 km which is not an option in urban environments and would lead to a situation where the second operator cannot build its network.

Nevertheless, in urban environments the propagation loss is typically much higher, especially if there is no line-of-sight between the sites of the first and the second operator. Therefore, if the second operator has or could have accurate knowledge of the path-loss to the sites of the first operator, then the second operator could build its own network without causing harmful interference to the first operator and without receiving harmful interference from the first operator.

The invention enables the second operator to get an accurate knowledge of the path-loss to the sites of the first operator, and accordingly, the interference to and from the sites of the first operator.

In accordance with some embodiments of the invention, the first operators' APs send a beacon with a fixed signal strength to form an exclusion zone around them. It will be recognized that the signal strength does not have to be fixed. FIG. 5 shows an example of a TDD-FDD coexistence exclusion zone. In FIG. 5, Cell A contains the AP 1 which transmits in FDD mode while Cell B and Cell C are receiving a TDD signal at AP2 and AP3, respectively. The circles (solid line and doted line) indicate the exclusion zone originated by the existing network, and consequently set a requirement to the transmit powers of the second operators' network.

The information about the beacons' signal strength is part of the information transmitted in the beacon signal. In case the network uses flexible spectrum usage mechanism with dedicated and shared spectrum bands then the beacon signal is to be transmitted on a dedicated channel by the first operator, to ensure that it is always operational. Further, the beacon signal may contain (and not restrictive) information about the interference level that the system can tolerate (an acceptable interference threshold level) and the transmit power of the AP in normal operation.

If the first operator is operating on a FDD mode, the first operators' APs may send this beacon on both the transmitter and the receiver frequency band (e.g. UL/DL) and this information (interference level, transmit power) is part of the information in the beacon signal. In the case of systems using TDD mode one beacon is of course sufficient. Even for an FDD system one beacon could be used, but two beacons would allow more accurate measurements. In the case of one single beacon for an FDD system, a safety margin should be added to the measurements to compensate for the different properties of the UL and DL frequency bands. FIG. 4 illustrates the operation requirements at the first operators' AP and at the second operators' AP for some embodiments of the invention.

It should be recognized that in some embodiments of the invention the beacon signal does not have to be sent constantly. It is sufficient if the beacon signal is sent for example every 20 seconds or at some other suitable interval. Thus, sending the beacon signal does not reduce the system capacity and limit the power consumption. In the two-operator scenario, it might even be sufficient if the beacon is sent only when the network of the second operator is built and during operation only at agreed time intervals, i.e. in a periodical manner, to check for possible conflicts between the two networks. This would probably require that the operators agree on the time period when the second network is built.

The APs of the second operators' network will be required to scan the neighboring frequency bands for this beacon before the second operator's network starts operating. If the second operator receives a beacon, the second operator would estimate the received signal strength, the resulting coupling loss and based on its own transmission power, the interference the second operator will create to the first operators' AP. If the interference created to the first operators' AP is below the acceptable interference threshold sent in the beacon signal, then the second operators' AP is allowed to operate. If the interference is above the threshold, then the second operators' AP has to lower the transmission power accordingly, change the antenna direction or a different location has to be found for the AP. This should be done automatically and in principle should not require any human interaction.

In future wireless communication systems (e.g B3G systems) that utilize flexible spectrum usage mechanism, the first operators' AP may be using other spectrum bands than its dedicated or assigned band (e.g. it could also be using some shared band that it has access to). The shared band might interfere with the second operators' AP. In these embodiments of the invention, the beacon should further contain information of other spectrum bands that the first operators' AP is or might be using.

As illustrated in the multi-operator example above, a single operator can use the technical solution provided by the invention to coordinate the deployment of its own FDD and TDD wireless communication networks or modes.

Performance Optimization

The use of this invention is not restricted to the deployment of the systems. It can also be used to automatically optimize the performance of two or more systems operating in the same geographical area.

Example I

The case of an operator operating two wireless communication systems in neighboring bands in the same geographical area is illustrated in this example of an embodiment of the invention.

The APs of the two systems scan regularly (e.g. every hour) the neighboring frequency bands for a beacon. If the APs receive a beacon, they estimate the received signal strength, the resulting coupling loss and based on AP's own transmission power, the interference it will create to the AP of the other system and respond accordingly:

(a) If the interference created to the other AP is below the acceptable interference threshold level sent in the beacon signal, then the AP does not have to change its operation.

(b) If the interference is above the acceptable interference threshold level, then the AP can for example lower the power accordingly or change the antenna radiation pattern (e.g. by beamforming or mechanically changing the antenna direction) until the interference is below the acceptable interference threshold level.

(c) Alternatively the two APs can jointly try to reduce the mutual interference, e.g. by lowering the transmit power or by changing the antenna radiation pattern until the interference is below the acceptable interference threshold level.

Conflict Detection

The use of this invention is not restricted to the deployment of the systems or to optimize the performance of two or more systems operated by the same operator. In some embodiments, the invention can also be used to detect conflicts between two or more systems of different operators, operating in the same geographical area. Even though the systems have been deployed using this invention, conflicts can arise when the systems are operating due to:

(1) Environment changes such as trees that are cut down, buildings that are torn down or built, etc.
(2) Changes in the antenna installation of one of the system
(3) Other changes Example II The case of two operators operating two wireless communication systems in neighboring bands in the same geographical area is illustrated in this example of an embodiment of the invention.

The APs of the two systems scan regularly (e.g. every hour) the neighboring frequency bands for a beacon. If the APs receive a beacon, they estimate the received signal strength, the resulting coupling loss and based on the AP's own transmission power, the interference it will create to the AP of the other system and respond accordingly:

(a) If the interference created to the other AP is below the threshold sent in the beacon signal, then the AP does not have to change its operation.

(b) If the interference is above the acceptable interference threshold level, then the AP takes an action depending on the agreement between the operators.

(1) If the other operator has priority in the area, then the AP will lower the power accordingly or change the antenna radiation pattern (e.g. by beamforming or mechanically changing the antenna direction) until the interference is below the acceptable interference threshold level.

(2) If one operator has priority in the area, it will inform the other operator that it will create interference to the other's AP. The AP of the other operator can then for example try to reduce the effect of the interference by changing its antenna reception pattern.

(3) If both operators have the same priority, the APs jointly try to reduce the mutual interference, e.g. by lowering the transmit power or by changing the antenna radiation pattern until the interference is below the acceptable interference threshold level.

The method of some embodiments of the invention may be carried out by a suitably configured mobile terminal, node, point or device such as the guard band reduction enabled apparatus shown by way of example in functional block diagram form in FIG. 8. The implementation of the apparatus shown in FIG. 8 may be carried out by any suitable means including a processor, chipset, computer program, and in other ways known to those skilled in the art.

Some embodiments of the invention can be used by any wireless communication systems which are facing similar deployment issues. This includes any beyond third generation (B3G) system such as the WINNER system currently researched in the WINNER project. The term WINNER is exemplary and the invention is not limited to the WINNER system. In some embodiments, the invention can be used in the WINNER context to coordinate the APs of different WINNER operators (operating in either FDD and TDD bands), as well as to coordinate the FDD and TDD APs of a single WINNER operator. Secondly, the WINNER system will have a local area mode. It is expected that home users will set up their own APs similar to today's WLAN APs. In such a case these embodiments of the invention can be used to prevent harmful interference from the home APs to the WINNER networks at adjacent frequency bands and provide self-awareness for the AP when being deployed.

Figure 9:
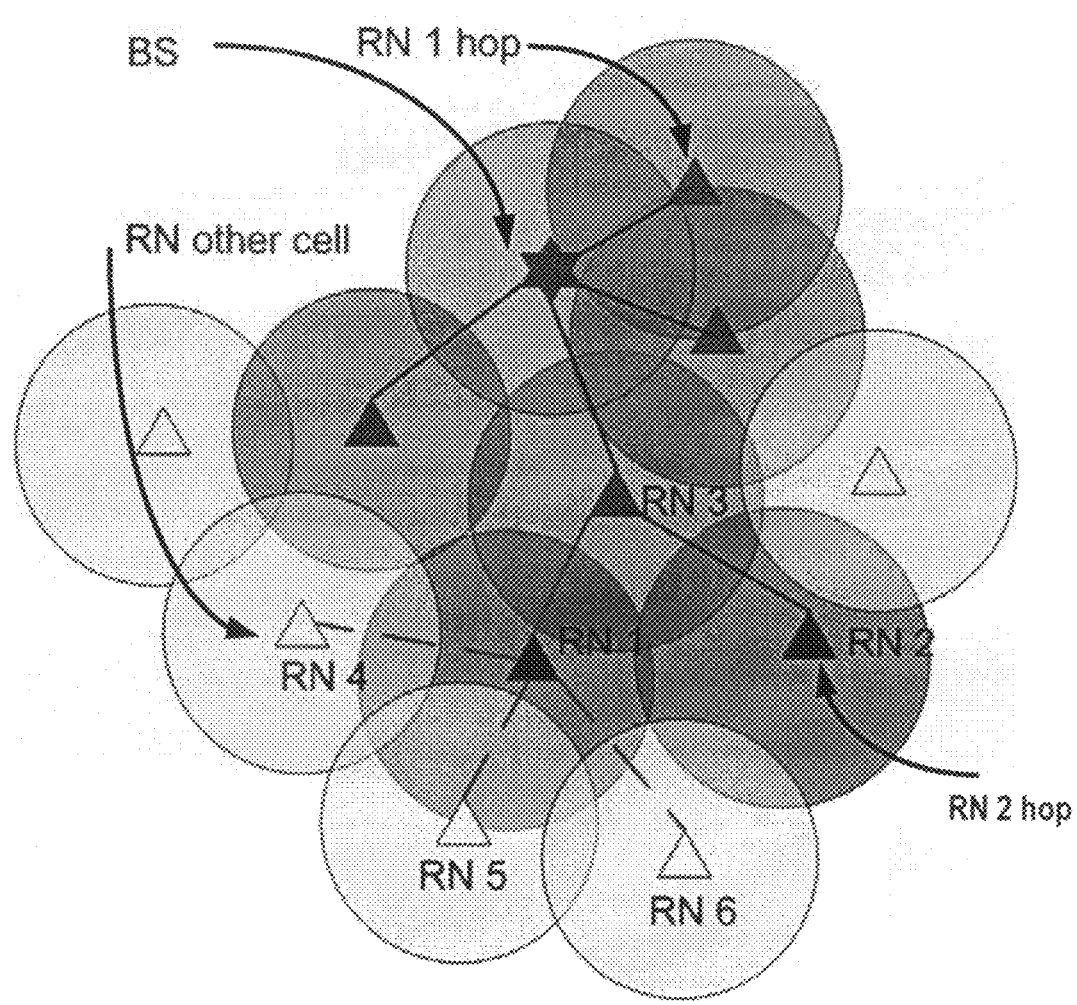
FIG. 9 shows an access point in a relay node system in which the concept of the beacon signal of some embodiments of the invention may be utilized to determine interference.

With reference to FIG. 9, in other embodiments, the invention concerns access points in the Future Radio Network, which is being studied in the WINNER project and includes the concept of a relay node. The relay node can be for example a users personal access point. The access point can be a Base Station, a User Terminal or Relay node.

FIG. 9 is an illustrative example of such a system in which some embodiments of the invention may be used. Basically a Relay Node is an access point which is not able to provide other devices an access to another network, but it can relay the message to some other Relay Node or to a Base station. Although as described above, in some embodiments the invention is particularly intended to be used when setting up a base station, in some embodiments the invention is also very useful when setting up any kind of access point. Because it is practically impossible to control the placement of personal access points and such personal access points are invisible most of the time, there is no awareness of the personal access points until it attempts to see if interference is caused so setting up a new access point manually could be extremely frustrating. Employing one or more embodiments of the invention makes it much easier to set up an access point to avoid causing interference.

The invention involves or is related to cooperation between elements of a communication system. Examples of a wireless communication system include implementations of GSM (Global System for Mobile Communication) and implementations of UMTS (Universal Mobile Telecommunication System). These elements of the communication systems are exemplary only and does not bind or restrict the invention in any way to only these elements of the communication systems since the invention is likely to be used for B3G systems. Each such wireless communication system includes a radio access network (RAN). In UMTS, the RAN is called UTRAN (UMTS Terrestrial RAN). A UTRAN includes one or more Radio Network Controllers (RNCs), each having control of one or more Node Bs, which are wireless terminals configured to communicatively couple to one or more UE terminals. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS). The invention considers the term APs to cover broadly BSs, nodeBs, relays etc.

Figure 10:
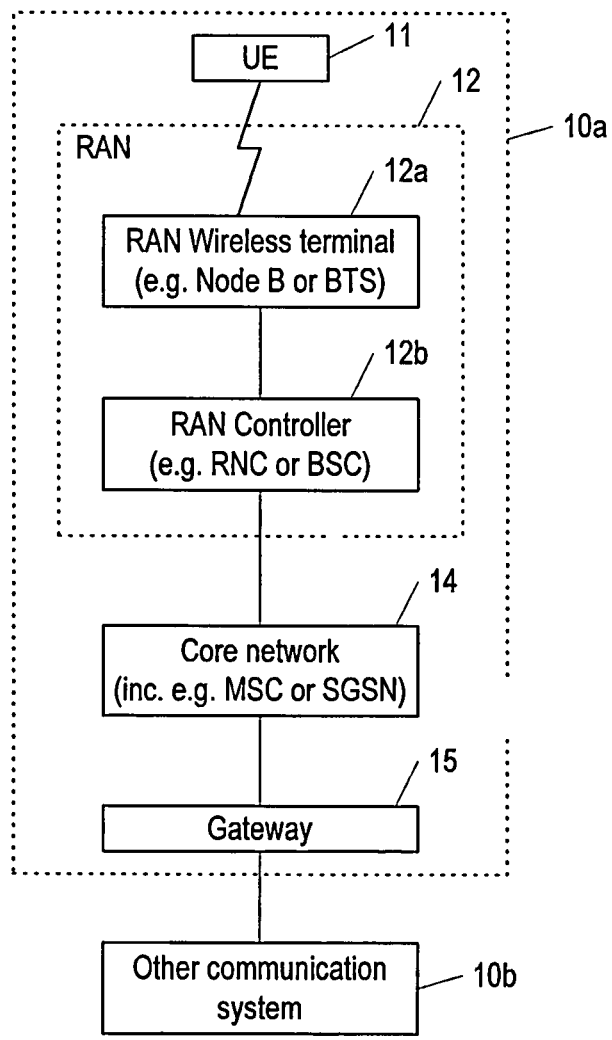
FIG. 10 is a block diagram/flow diagram of a wireless communication system in which some embodiments of the invention may be implemented, including various communication terminals, and in particular a user equipment (UE) terminal and a wireless terminal of a radio access network (RAN).

Referring now to FIG. 10, a wireless communication system 10a in which the present invention may be implemented is shown, including a UE terminal 11, a radio access network 12, a core network 14 and a gateway 15, coupled via the gateway to another communications system 10b, such as the Internet, wireline communication systems (including the so-called plain old telephone system), and/or other wireless communication systems. The radio access network includes a wireless terminal 12a (e.g. a Node B or a BTS) and a controller 12b (e.g. a RNC or a BSC). The controller is in wireline communication with the core network. The core network typically includes a mobile switching center (MSC) for circuit-switched communication, and a serving general packet radio service (GPRS) support node (SGSN) for packet-switched communication.

Figure 11:
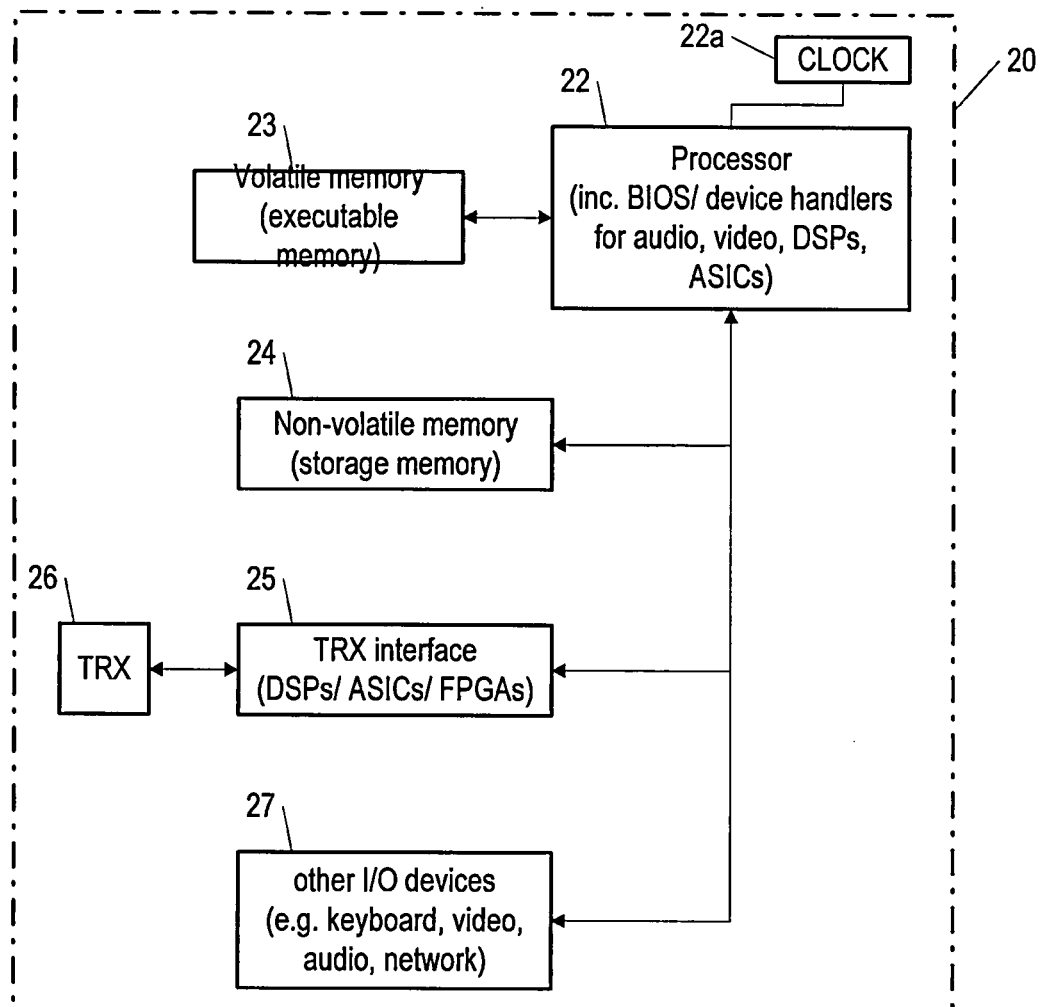
FIG. 11 is a reduced block diagram (only portions relevant to the invention being shown) of the UE terminal or the wireless terminal of the RAN of FIG. 9.

FIG. 11 shows some components of a communication terminal 20, which could be either the UE terminal 11 or the RAN wireless terminal 12a of FIG. 10. The communication terminal includes a processor 22 for controlling operation of the device, including all input and output. The processor, whose speed/timing is regulated by a clock 22a, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 26 via a TRX interface 25 including possibly one or more digital signal processors (DSPs), application specific integrated circuits (ASICs), and/or field programmable gate arrays (FPGAs). The TRX enables communication over the air with another similarly equipped communication terminal.

Still referring to FIG. 11, the communication terminal includes volatile memory, i.e. so-called executable memory 23, and also non-volatile memory 24, i.e. storage memory. The processor 22 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Figure 12:
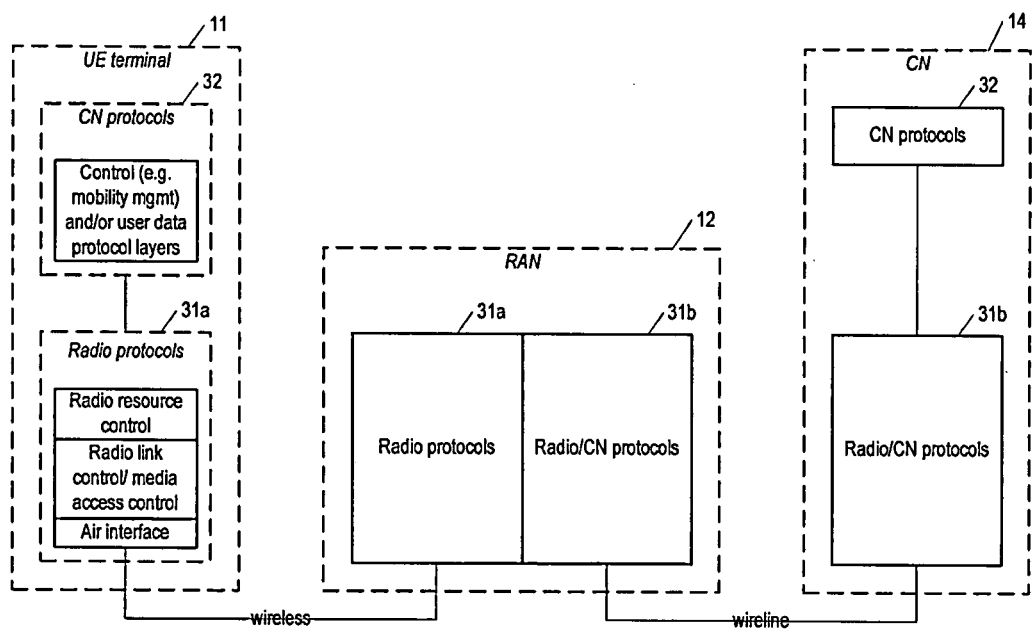
FIG. 12 is a reduced block diagram of two communications terminals of FIG. 10 in terms of a multi-layered communication protocol stack.

Referring now to FIG. 12, the wireless communication system of FIG. 10 is shown from the perspective of layers of a protocol according to which communication is performed. The layers of protocol form a protocol stack, and include CN protocol layers 32 located in the UE 11 and CN 14, and radio protocol layers 31a located in the UE terminal and in the RAN 12 (in either the RAN wireless terminal 12a or the RAN controller 12b). Communication is peer-to-peer. Thus, a CN protocol layer in the UE communicates with a corresponding layer in the CN, and vice versa, and the communication is provided via lower/intervening layers. The lower/intervening layers thus provide as a service to the layer immediately above them in the protocol stack the packaging or unpackaging of a unit of communication (a control signal or user data).

The CN protocols typically include one or more control protocol layers and/or user data protocol layers (e.g. an application layer, i.e. the layer of the protocol stack that interfaces directly with applications, such as a calendar application or a game application).

The radio protocols typically include a radio resource control (protocol) layer, which has as its responsibilities, among quite a few others, the establishment, reconfiguration, and release of radio bearers. Another radio protocol layer is a radio link control/media access control layer (which may exist as two separate layers). This layer in effect provides an interface with the physical layer, another of the radio access protocol layers, and the layer that enables actual communication over the air interface.

The radio protocols are located in the UE terminal and in the RAN, but not the CN. Communication with the CN protocols in the CN is made possible by another protocol stack in the RAN, indicated as the radio/CN protocols stack. Communication between a layer in the radio/CN protocols stack and the radio protocols stack in the RAN may occur directly, rather than via intervening lower layers. There is, as shown in FIG. 9, a corresponding radio/CN protocols stack located in the CN, allowing then communication between the application level in the UE terminal and the application level in the CN.

Figure 13:
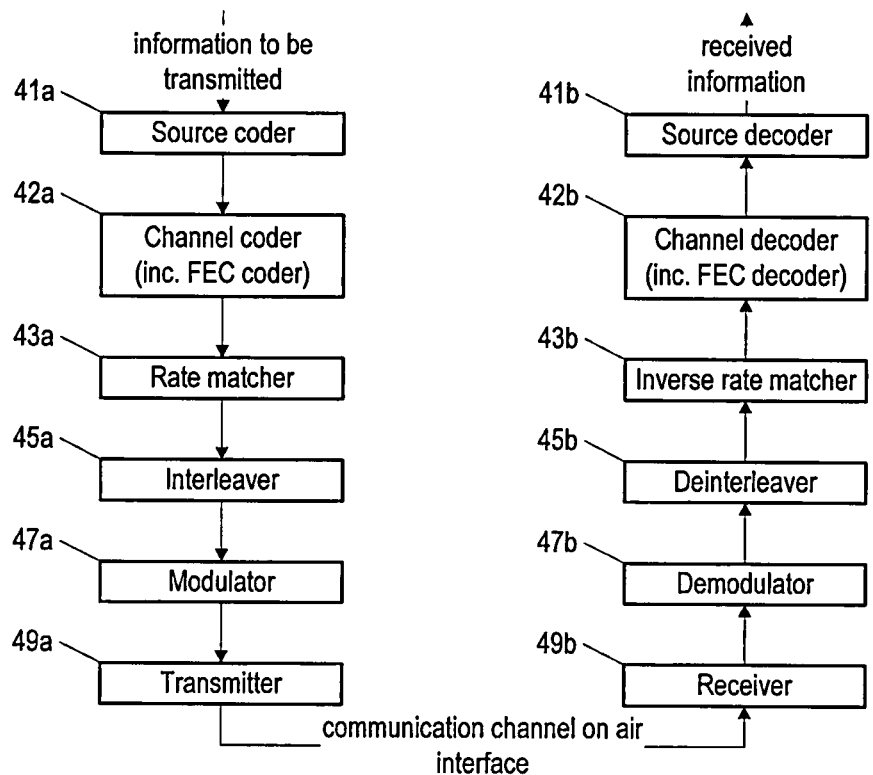
FIG. 13 is a reduced block diagram of the user equipment terminal and the wireless terminal of the radio access network in terms of functional blocks corresponding to hardware equipment used in sending and receiving communication signals over an air interface communication channel linking the two communications terminals.

FIG. 13 is a reduced block diagram of the UE communication terminal 11 and the RAN wireless communication terminal 12a of FIG. 10, in terms of functional blocks corresponding to typically hardware (but in some cases software) equipment used in sending and receiving communication signals over a communication channel linking the two communications terminals 11 12a. Both typically include a source coder 41a responsive to information to be transmitted, and a corresponding source decoder 41b. The source coder removes redundancy in the information not needed to communicate the information. Both also include a channel coder 42a and a corresponding channel decoder 42b. The channel coder typically adds redundancy that can be used to correct error, i.e. it performs forward error correction (FEC) coding. Both communication terminals also include a rate matcher 43a and corresponding inverse rate matcher 43b. The rate matcher adds or removes (by so-called puncturing) bits from the bit stream provided by the channel coder, in order to provide a bit stream at a rate compatible with the physical channel being used by the communication terminals. Both communication terminals also include an interleaver 45a and a deinterleaver 45b. The interleaver reorders bits (or blocks of bits) so that strings of bits representing related information are not contiguous in the output bit stream, thus making the communication more resistant to so-called bursty errors, i.e. to errors from temporary causes and so that affect the communication for only a limited time, and so affect only a portion of the communicated bit stream. Both communication terminals also include a modulator 47a and a demodulator 47b. The modulator 47a maps blocks of the bits provided by the interleaver to symbols according to a modulation scheme/mapping (per a symbol constellation). The modulation symbols thus determined are then used by a transmitter 49a included in both communication terminals, to modulate one or more carriers (depending on the air interface, e.g. WCDMA, TDMA, FDMA, OFDM, OFDMA, CDMA2000, etc.) for transmission over the air. Both communication terminals also include a receiver 49b that senses and so receives the communication terminal and determines a corresponding stream of modulation symbols, which it passes to the demodulator 47b, which in turn determines a corresponding bit stream (possibly using FEC coding to resolve errors), and so on, ultimately resulting in a providing of received information (which of course may or may not be exactly the transmitted information). Usually, the channel decoder includes as components processes that provide so-called HARQ (hybrid automatic repeat request) processing, so that in case of an error not able to be resolved on the basis of the FEC coding by the channel coder, a request is sent to the transmitter (possibly to the channel coder component) to resend the transmission having the unresolvable error.

The functionality described above (for both the radio access network and the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

The invention may be used in any wireless system including but not limited to B3G wireless systems for example, Long Term Evolution (LTE) (also known as 3.9G), which refers to research and development involving the Third Generation Partnership Project (3GPP) aimed at identifying technologies and capabilities that can improve systems such as the UMTS.

Generally speaking, a prefix of the letter "E" in upper or lower case signifies LTE, although this rule may have exceptions. The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

Figure 14:
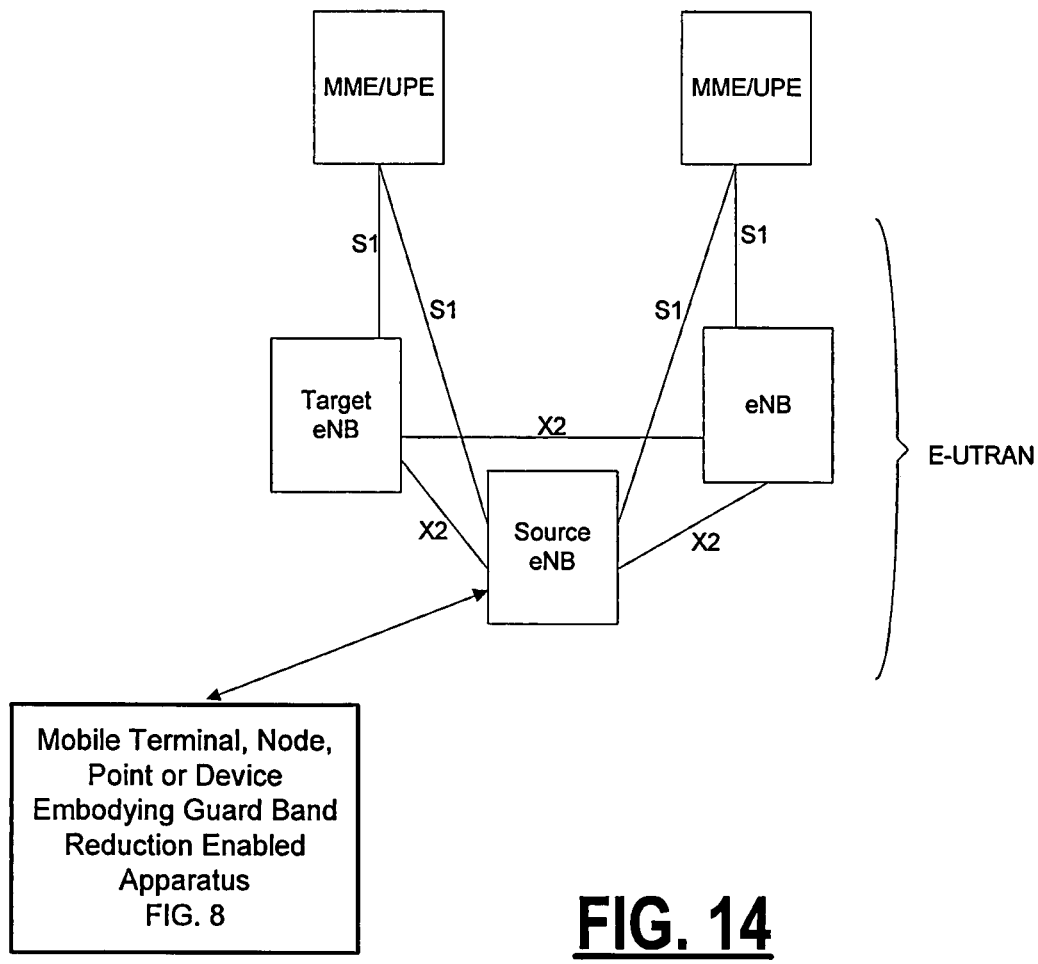
FIG. 14 shows an example of an E-UTRAN architecture with which a mobile terminal, node, point or device according to some embodiments of the invention may be used.

An example of the E-UTRAN architecture is illustrated in FIG. 14. This example of E-UTRAN consists of eNBs, providing the E-UTRA user plane (RLC/MAC/PHY) and control plane (RRC) protocol terminations towards the UE. The eNBs are interconnected with each other by means of the X2 interface. The eNBs are also connected by means of the S1 interface to the EPC (evolved packet core) more specifically to the MME (mobility management entity) and the UPE (user plane entity). The S1 interface supports a many-to-many relation between MMEs/UPEs and eNBs. The S1 interface supports a functional split between the MME and the UPE. The MMU/UPE in the example of FIG. 10 is one option for the access gateway (aGW).

In the example of FIG. 14, there exists an X2 interface between the eNBs that need to communicate with each other. For exceptional cases (e.g. inter-PLMN handover), LTE_ACTIVE inter-eNB mobility is supported by means of MME/UPE relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

The functionality described above (for both the radio access network and the UT) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of some of the embodiments of the present invention. Numerous modifications and alternative arrangements may be devised by those skilled in the art without departing from the scope of the present invention.

The invention claimed:

1. A method, comprising:
   scanning for at least one interfering frequency band in a geographical area of a first wireless communication system configured to operate in at least one first frequency band and a second wireless communication system configured to operate in at least one second frequency band, by a second apparatus operating in the second wireless communication system, wherein the at least one second frequency band is different from the at least one first frequency band;
   receiving at the second apparatus a signal from a first apparatus operating in the first wireless communication system indicating the at least one interfering frequency band that receives interference from at least one second frequency band of the second wireless communication system and encoding information of an acceptable interference level;
   decoding the acceptable interference level from the received signal;
   estimating interference based to the first apparatus on the signal;
   configuring the operation of the second apparatus in response to the estimated interference to the first apparatus not exceeding the acceptable interference level with a similar or reduced guard band between the at least one interfering frequency band and the at least one second frequency band of the second wireless communication system.

2. The method according to claim 1 further comprising changing an antenna radiation pattern direction or a second apparatus location in the second wireless communication system in response to interference created by the first apparatus in the first wireless communication system to the second apparatus exceeding the acceptable interference level.

3. The method according to claim 1 further comprising changing an antenna radiation pattern direction or a second apparatus location in the second wireless communication system in response to the estimated interference exceeding the acceptable interference level.

4. The method according to claim 1 further comprising reducing a transmit transmission power in response to the estimated interference exceeding the acceptable interference level.

5. The method according to claim 1 further comprising receiving a beacon signal on a designated frequency band, and scanning in the second wireless communication system frequency bands adjacent to the designated frequency band.

6. The method according to claim 5 further comprising in a frequency division duplex wireless communication system transmitting said beacon signal on both a receiver receiving frequency band and on a transmit transmission frequency band.

7. The method according to claim 5 further comprising in a time division duplex wireless communication system transmitting said beacon signal on a time division duplex frequency band.

8. The method according to claim 5 wherein the beacon signal includes information of at least a transmission power of the beacon signal and a transmission power in the first apparatus normal operating mode.

9. The method according to claim 1 further comprising checking for interference caused to the second apparatus by calculating a coupling loss between the first and second wireless communication systems.

10. The method according to claim 9 further comprising calculating the interference caused by the first apparatus to the second access point.

11. The method according to claim 1 wherein the acceptable interference level is a predetermined threshold interference level.

12. The method according to claim 1 wherein the acceptable interference level is based on a second apparatus complaint that the interference caused to the second apparatus by the first apparatus is too high.

13. The method according to claim 1 further comprising operating the second apparatus in the second wireless communication system in response to not receiving interference from the first apparatus in the first wireless communication system.

14. An apparatus comprising at least one processor; and at least one memory including computer program code, the at least one memory and the computer program code configured to, with the at least one processor, cause the apparatus to perform at least the following:
   to receive a signal in a geographic area of a first wireless communication system where both the first wireless communication system and a second wireless communication system operate, the signal encoding information of an acceptable interference level;
   to decode the acceptable interference level from the received signal;
   to check for interference caused by at least one interfering frequency band included in at least one first frequency band configured for operation in the first wireless communication system to at least one second frequency band configured for operation in the second wireless communication system, wherein the at least one second frequency band is different from the at least one first frequency band; and
   to operate the at least one second frequency band of the second wireless system in response to an interference level of the checked interference not exceeding the acceptable interference level in the second wireless communication system with a similar or reduced guard band between the at least one first frequency band and the at least one second frequency band of the second wireless communication system,
   wherein the signal indicates the at least one interfering frequency band.

15. The apparatus according to claim 14 wherein the received signal is a beacon signal.

16. The apparatus according to claim 14 wherein, when checking for interference, the at least one memory and the computer program code are further configured to cause the apparatus to calculate the coupling loss between the first and second wireless communication systems.

17. The apparatus according to claim 14 wherein, when checking for interference, the at least one memory and the computer program code are further configured to cause the apparatus to calculate the interference caused by the first wireless communication system to the second wireless communication system.

18. The apparatus according to claim 14 wherein the first and second wireless communication systems are operated by one operator operating in neighboring frequency bands in the same geographical area is configured to scan regularly the neighboring frequency bands or a beacon signal and in response thereto to estimate the receiver signal strength and the resulting coupling loss and based upon the transmission power of the apparatus in the respective first and second wireless communication system estimate the interference the apparatus will create to the apparatus of the other wireless communication system and respond accordingly by the following:
  (a) If the interference created to the other wireless communication system is below the acceptable interference threshold level sent in the beacon signal, then the apparatus does not have to change its operation;
  (b) If the interference is above the acceptable interference threshold level, then the apparatus can lower the power accordingly or change the antenna radiation pattern until the interference level is below the acceptable threshold level;
  (c) Alternatively the apparatus of the two wireless communication systems can jointly try to reduce the mutual interference by lowering the transmit power or by changing the antenna radiation pattern until the interference level is below the acceptable threshold level.

19. The apparatus according to claim 14 wherein the first and second wireless communication systems are operated by two different operators operating in neighboring frequency bands in the same geographical area is configured to scan regularly the neighboring frequency bands or a beacon signal and in response thereto to estimate the receiver signal strength and the resulting coupling loss and based upon the transmission power of the apparatus in the respective first and second wireless communication system estimate the interference the apparatus will create to the apparatus of the other wireless communication system and respond accordingly by the following:
  (a) If the interference created to the other wireless communication system is below the acceptable interference threshold level sent in the beacon signal, then the wireless communication system does not have to change its operation;
  (b) If the interference is above the acceptable interference threshold level, then the wireless communication system takes an action depending on the agreement between the respective operators of the two wireless communication systems;
  (1) If the other operator has priority in the area, then the wireless communication system will lower the power accordingly or change the antenna radiation pattern until the interference is below the acceptable interference threshold level;
  (2) If the one operator has priority in the area, the operator that has priority will inform the other operator that the operator that has priority will create interference to the other's apparatus and in response thereto the apparatus of the other operator can then try to reduce the effect of the interference by changing its antenna reception pattern;
  (3) If both operators have the same priority, the terminals, node, points or devices jointly try to reduce the mutual interference, by lowering its respective transmit power or by changing its respective antenna radiation pattern until the interference is below the acceptable interference threshold level.

20. An apparatus, comprising:
  means for receiving the signal in a geographic area of a first wireless communication system where both the first wireless communication system and a second wireless communication system operate, the signal encoding information of an acceptable interference level;
  means for decoding the acceptable interference level from the received signal;
  means for checking the interference caused by at least one interfering frequency band included in at least one first frequency band configured for operation in the first wireless communication system to at least one second frequency band configured for operation in the second wireless communication system, wherein the at least one second frequency band is different from the at least one first frequency band; and
  means for operating the at least one second frequency band of the second wireless system in response to the interference level not exceeding an acceptable interference level in the second wireless communication system with a similar or reduced guard band between the at least one first frequency band and the at least one second frequency band of the second wireless communication system,
  wherein the signal indicates the at least one interfering frequency band.

21. The apparatus according to claim 20 further comprising means for changing an antenna radiation pattern direction or an apparatus location in the second wireless communication system in response to interference created by an apparatus in the first wireless communication system to an apparatus in the second wireless communication system exceeding the acceptable interference level.

22. The apparatus according to claim 21 further comprising means for calculating the interference caused by the first wireless communication system to the second wireless communication system.

23. The apparatus according to claim 20 further comprising means for changing an antenna radiation pattern direction or an second apparatus location in the second wireless communication system in response to interference created to the first apparatus in the first wireless communication system exceeding the acceptable interference level.

24. The apparatus according to claim 20 further comprising means for reducing a transmit transmission power in response to interference created to the first access point in the first wireless communication system exceeding the acceptable interference level.

25. The apparatus according to claim 20 wherein said means for checking for interference caused to the second apparatus further comprises means for calculating a coupling loss between the first and second wireless communication systems.

26. The apparatus according to claim 20 further comprising means for receiving from a first apparatus in the first wireless communication system a beacon signal on a designated frequency band, and means for scanning in the second wireless communication system frequency bands adjacent to the designated frequency band.

27. A computer program product comprising a non-transitory computer readable structure embodying computer program code therein for execution by a computer processor, said computer program further comprising instructions that when executed by a computer, perform:

scanning for at least one interfering frequency band in a geographical area of a first wireless communication system configured to operation in at least one first frequency band and a second wireless communication system configured to operate in at least one second frequency band, by a second apparatus operating in the second wireless communication system, wherein the at least one second frequency band is different from the at least one first frequency band;

receiving at the second apparatus a beacon signal from a first apparatus operating in the first wireless communication system indicating the at least one interfering frequency band that causes interference to the at least one second frequency band of the second wireless communication system and encoding information of an acceptable interference level;

decoding the acceptable interference level from the received signal;

estimating interference based on the beacon signal;

configuring the operation of the second apparatus in response to the interference to the second apparatus not exceeding the acceptable interference level with a similar or reduced guard band between the at least one interfering frequency band and the at least one second frequency band of the second wireless communication system.

28. An application specific integrated circuit configured to perform:

scanning for at least one interfering frequency band in a geographical area of a first wireless communication system configured to operation in at least one first frequency band and a second wireless communication system configured to operate in at least one second frequency band, by a second apparatus operating in the second wireless communication system, wherein the at least one second frequency band is different from the at least one first frequency band;

receiving at the second apparatus a beacon signal from a first apparatus operating in the first wireless communication system indicating the at least one interfering frequency band that causes interference to the at least one second frequency band of the second wireless communication system and encoding information of an acceptable interference level;

decoding the acceptable interference level from the received signal;

estimating interference based on the beacon signal;

configuring the operation of the second apparatus in response to the interference to the second apparatus not exceeding the acceptable interference level with a similar or reduced guard band between the at least one interfering frequency band and the at least one second frequency band of the second wireless communication system.

* * * * *